United States Patent
Kong et al.

(10) Patent No.: US 9,142,238 B2
(45) Date of Patent: Sep. 22, 2015

(54) VERTICAL MAGNETIC RECORDING DISK MANUFACTURING METHOD AND VERTICAL MAGNETIC RECORDING DISK

(75) Inventors: Kim Kong, Tuas Link (SG); Jo Alvin Dumaya, Ottendorf-Okrilla (DE)

(73) Assignee: WD Media (Singapore) Pte. Ltd., Singapore (SG)

( * ) Notice: Subject to any disclaimer, the term of this patent is extended or adjusted under 35 U.S.C. 154(b) by 1221 days.

(21) Appl. No.: 12/295,496

(22) PCT Filed: Mar. 29, 2007

(86) PCT No.: PCT/JP2007/056997
§ 371 (c)(1),
(2), (4) Date: Mar. 25, 2009

(87) PCT Pub. No.: WO2007/116813
PCT Pub. Date: Oct. 18, 2007

(65) Prior Publication Data
US 2009/0202866 A1 Aug. 13, 2009

(30) Foreign Application Priority Data
Mar. 30, 2006 (JP) ................................. 2006-093033

(51) Int. Cl.
*C23C 14/16* (2006.01)
*G11B 5/66* (2006.01)
(Continued)

(52) U.S. Cl.
CPC .............. *G11B 5/667* (2013.01); *G11B 5/7325* (2013.01); *G11B 5/851* (2013.01)

(58) Field of Classification Search
CPC .......... C23C 14/14; C23C 14/16; G11B 5/66; G11B 5/667; G11B 5/7325; G11B 5/851
USPC ....................................................... 204/192.2
See application file for complete search history.

(56) References Cited

U.S. PATENT DOCUMENTS 5,106,703 A * 4/1992 Carcia .......................... 428/635
6,468,670 B1 * 10/2002 Ikeda et al. ................... 428/611
(Continued)

FOREIGN PATENT DOCUMENTS

JP 07-262546 A 10/1995
JP 2002-74648 A 3/2002
(Continued)

OTHER PUBLICATIONS

Machine Translation of Senzaki et al. dated Nov. 2002.*
(Continued)

*Primary Examiner* — Rodney McDonald

(57) ABSTRACT

In a method of manufacturing a magnetic disk including at least a magnetic recording layer on a substrate 1 and used for vertical magnetic recording, in a step of forming, on the substrate 1, the magnetic recording layer composed of a ferromagnetic layer 5 having a granular structure and an exchange energy control layer 7 constituted by a laminated layer formed on the ferromagnetic layer 5, at least the exchange energy control layer 7 is formed through sputtering in an atmosphere of a rare gas having a greater mass than an argon gas. The rare gas having a greater mass than the argon gas is a krypton (Kr) gas, for example. The exchange energy control layer 7 is a laminated layer composed of a first layer containing Co or a Co-alloy and a second layer containing palladium (Pd) or platinum (Pt), for example.

12 Claims, 1 Drawing Sheet

(51) Int. Cl.
   *G11B 5/667* (2006.01)
   *G11B 5/73* (2006.01)
   *G11B 5/851* (2006.01)

(56) References Cited

U.S. PATENT DOCUMENTS

| | | | |
|---|---|---|---|
| 6,753,072 B1 * | 6/2004 | Chen et al. | 428/828 |
| 6,862,158 B2 * | 3/2005 | Hasegawa et al. | 360/324.11 |
| 6,893,542 B1 * | 5/2005 | Chen | 204/192.2 |
| 7,105,240 B2 * | 9/2006 | Wu et al. | 428/832.1 |
| 2003/0162041 A1 | 8/2003 | Nemoto | |
| 2004/0247941 A1 * | 12/2004 | Chen et al. | 428/694.001 |
| 2005/0142378 A1 | 6/2005 | Nemoto | |
| 2005/0158585 A1 | 7/2005 | Takahashi et al. | |
| 2006/0019125 A1 | 1/2006 | Gouke | |
| 2007/0148499 A1 * | 6/2007 | Sonobe et al. | 428/828 |

FOREIGN PATENT DOCUMENTS

| | | | |
|---|---|---|---|
| JP | 2002-92865 A | | 3/2002 |
| JP | 2002-342908 | * | 11/2002 |
| JP | 2003-248914 A | | 9/2003 |
| JP | 2005-38495 A | | 2/2005 |
| JP | 2005-190538 A | | 7/2005 |
| JP | 2005-327325 A | | 11/2005 |
| JP | 2006-24261 A | | 1/2006 |
| WO | 2006-003922 A1 | | 1/2001 |
| WO | 2006/003922 A1 | | 1/2006 |
| WO | WO 2006/003922 | * | 1/2006 |

OTHER PUBLICATIONS

Japanese Office Action dated Aug. 25, 2009 in Application No. 2008-509815.
Singapore Search Report and Written Opinion dated Sep. 10, 2013 for related Singapore Application No. 201102280-3, 17 pages.

* cited by examiner

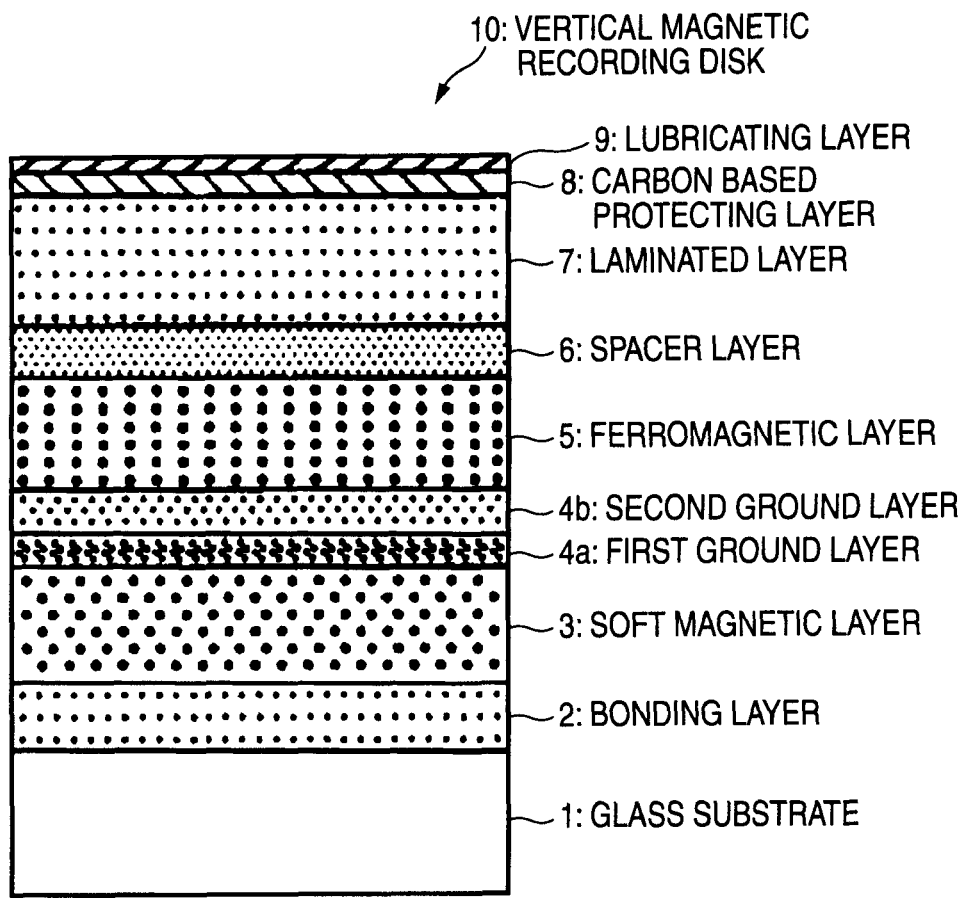

VERTICAL MAGNETIC RECORDING DISK MANUFACTURING METHOD AND VERTICAL MAGNETIC RECORDING DISK

TECHNICAL FIELD

The present invention relates to a vertical magnetic recording disk to be loaded onto a magnetic disk device such as a hard disk drive (HDD) using a vertical magnetic recording system.

BACKGROUND ART

With a recent increase in a capacity of an information processing, various information recording techniques have been developed. In particular, a surface recording density of a hard disk drive (HDD) using a magnetic recording technique has been continuously increased at an annual rate of approximately 100%. Recently, there has been demanded an information recording capacity exceeding 60 Gbytes per 2.5-inch diameter magnetic disk to be used for the HDD. In order to meet the requirements, it has been demanded to implement an information recording density exceeding 100 Gbits per square inch.

In order to achieve a high recording density in the magnetic disk to be used for the HDD, it has been required to microfabricate a magnetic crystal grain constituting a magnetic recording layer for recording an information signal and to reduce a thickness of the layer.

In case of a magnetic disk using an in-plane magnetic recording system (which is also referred to as a longitudinal magnetic recording system or a horizontal magnetic recording system) which has been conventionally commercialized, however, the microfabrication of the magnetic crystal grain has been developed. As a result, a thermal stability of a recording signal is deteriorated by a superparamagnetic phenomenon so that a thermal fluctuating phenomenon is generated, that is, the recording signal is eliminated, causing an inhibition of an increase in a recording density of the magnetic disk.

In order to eliminate the factors of the inhibition, a magnetic disk for a vertical magnetic recording system has been proposed in recent years.

In case of the vertical magnetic recording system, an easy axis of a magnetic recording layer is regulated to be oriented in a perpendicular direction to a substrate surface, which is different from the in-plane magnetic recording system.

Since the vertical magnetic recording system can suppress the thermal fluctuating phenomenon more greatly than the in-plane recording system, it is suitable for an increase in a recording density.

In the vertical magnetic recording disk, a so-called two-layer type vertical magnetic recording disk including, on a substrate, a soft magnetic ground layer formed of a soft magnetic material and a vertical magnetic recording layer formed of a hard magnetic material is preferable.

In the two-layer type vertical magnetic recording disk, it is possible to form a suitable magnetic circuit among the magnetic head, the vertical magnetic recording layer and the soft magnetic ground layer in magnetic recording, and the soft magnetic ground layer serves to help the magnetic recording onto the vertical magnetic recording layer.

As the two-layer type vertical magnetic recording disk, for example, there has been known a vertical magnetic recording medium described in JP-A-2002-74648 (Patent Document 1).

Moreover, JP-A-2002-92865 (Patent Document 2) has disclosed a technique related to a vertical magnetic recording medium in which a ground layer, a Co based vertical magnetic recording layer and a protecting layer are formed on a substrate in this order. Furthermore, U.S. Pat. No. 6,468,670 Specification (Patent Document 3) has disclosed a vertical magnetic recording medium having a structure in which an artificial lattice film continuous layer (a switched connection layer) that is subjected to a switching connection to a particulate recording layer is bonded.

Patent Document 1: JP-A-2002-74648
Patent Document 2: JP-A-2002-92865
Patent document 3: U.S. Pat. No. 6,468,670

DISCLOSURE OF THE INVENTION

Problems to be Solved

A recording density of a magnetic disk is mainly enhanced by a reduction in a magnetization transition region noise of a magnetic recording layer. In order to reduce the noise, it is necessary to enhance a crystal orientation of the magnetic recording layer and to reduce a crystal grain size and a magnitude of a magnetic interaction.

More specifically, in order to increase a recording density of a medium, it is desirable to cause the crystal grain size of the magnetic recording layer to be uniform and very small, and furthermore, to bring a segregation state in which individual magnetic crystal grains are magnetically fragmented. For this purpose, it is necessary to properly control a fine structure of the magnetic recording layer.

A Co based vertical magnetic recording layer disclosed in the Patent Document 1, above all, a CoPt based vertical magnetic recording layer is suitable. This is because a coercive force Hc can be high and a magnetization reversal generation magnetic field Hn can have a value which is smaller than zero so that a resistance to a thermal fluctuation can be enhanced and a high S/N ratio can be obtained.

Furthermore, the vertical magnetic recording layer is caused to contain an element such as Cr so that the Cr can be segregated into a grain boundary portion of a magnetic crystal grain. Therefore, it is possible to block the exchange interaction between the magnetic crystal grains, thereby increasing a recording density.

When an oxide such as $SiO_2$ or O is added to the CoPt based vertical magnetic recording layer, moreover, it is possible to form an excellent segregation structure without inhibiting an epitaxial growth of CoPt.

In other words, the oxide such as $SiO_2$ or O is segregated into the grain boundary so that the magnetic interaction between the crystal grains of the magnetic recording layer can be reduced.

Moreover, it is possible to reduce a crystal grain size by adding the oxide such as $SiO_2$ or O.

The crystal grain size and the magnitude of the magnetic intersection are influenced by a thickness of an $SiO_2$ layer segregated into the grain boundary or a crystal grain size of a ground layer.

When the amount of $SiO_2$ to be added to the magnetic recording layer is increased, an enhancement in a fineness and a magnetic fragmentation are advanced so that an S/N ratio in a high recording density can be enhanced.

Consequently, a maximum magnetic anisotropic energy Ku was increased up to almost a double of that of a conventional medium to which $SiO_2$ is not added. It was found that the problem of an S/N ratio or a thermal stability is not caused in a range of 200 to 400 Gbits/inch$^2$ in the magnetic recording disk.

According to investigations of the inventors, however, it was found that it is hard to fabricate a medium having a higher thermal stability and an excellent recording property by simply adding an oxide such as $SiO_2$ or O when a medium capable of addressing 400 Gbits/inch$^2$ or more is intended.

In other words, it was found that the coercive force Hc and the vertical magnetic anisotropy are deteriorated when an amount of the $SiO_2$ is increased up to a certain amount or more, for example.

For the demand, it is also possible to propose a method of increasing an amount of Pt in the magnetic recording layer, thereby increasing a magnetic anisotropic energy. However, it is apparent that there is also a new problem in that sufficient recording cannot be carried out with an increase in the magnetic anisotropic energy.

In a recording density region of 100 Gbits/inch$^2$ or more, particularly, a recording capability of a magnetic head itself is remarkably reduced with a reduction in tracking. For this reason, it is necessary to make an improvement for enhancing the recording capability on the magnetic recording layer side. This leads to a new problem.

There is no end to demand for an increase in an information recording density, and the demand has been increased yearly. In order to achieve the high recording density, it is demanded to enhance the magnetic property of the magnetic disk still more.

The present invention has been made in consideration of the conventional problems, and has an object to provide a method of manufacturing a vertical magnetic recording disk and the vertical magnetic recording disk which can increase an information recording density by implementing a more enhancement in a magnetic property.

Means for Solving the Problems

One of the applicants previously proposed a vertical magnetic recording disk, which includes a magnetic recording layer constituted by: a ferromagnetic layer having a granular structure containing Co; Co or a Co alloy formed on the ferromagnetic layer, for example; and an exchange energy control layer formed by an alternate laminated film of Pd or Pt, as a vertical magnetic recording disk capable of increasing a recording density by enhancing an S/N ratio (see Japanese Patent Application No. 2004-194175).

In the vertical magnetic recording disk including the magnetic recording layer constituted by the ferromagnetic layer having the granular structure and the exchange energy control layer formed by a specific alternate laminated film which is provided on the ferromagnetic layer, for example, a film thickness of the exchange energy control layer is usually smaller than that of the ferromagnetic layer. For this reason, a state of an interface to determine a magnetic property is very important.

According to investigations of the inventors, the exchange energy control layer is usually formed by a sputtering method. When energy of a neutral gas atom colliding with a target, reflected from the target and reaching a substrate is increased, however, a surface roughness of a film is increased. Thus, it was found that an interface state of the film is deteriorated and a magnetic property is reduced in some cases.

In a conventional manufacturing process, an Ar gas is used as a process gas in the sputtering film formation. However, it was also found that the energy of the neutral gas atom colliding with the target, reflected from the target and reaching the substrate is comparatively increased and the interface state of the formed film is apt to be deteriorated when the sputtering film formation is carried out in the Ar gas atmosphere.

Therefore, the inventors vigorously made studies in respect of a necessity of an improvement in a conventional manufacturing process in order to enhance the magnetic property still more. As a result, they found that it is possible to suitably suppress the deterioration in the interface state of the formed film by using a rare gas having a greater mass than a conventional Ar gas, for example, a Kr gas for a sputtering film forming gas of the exchange energy control layer, and completed the present invention.

More specifically, the present invention has the following structures to solve the problems.

(Structure 1) In a method of manufacturing a vertical magnetic recording disk comprising at least a magnetic recording layer on a substrate and used for vertical magnetic recording, in a step of forming, on the substrate, the magnetic recording layer composed of a ferromagnetic layer having a granular structure and an exchange energy control layer formed on the ferromagnetic layer, at least the exchange energy control layer is formed through sputtering in an atmosphere of a rare gas having a greater mass than an argon gas.

(Structure 2) In the method according to structure 1, the rare gas having a greater mass than the argon gas is a krypton (Kr) gas.

(Structure 3) In the method according to structure 1, the exchange energy control layer is a laminated layer composed of a first layer containing Co or a Co-alloy and a second layer containing palladium (Pd) or platinum (Pt), (Structure 4) In the method according to structures 1, the ferromagnetic layer has a crystal grain containing cobalt (Co) as a main constituent and a grain boundary portion containing an oxide, silicon (Si) or a silicon (Si) oxide as a main constituent.

(Structure 5) In the method according to structures 1, a spacer layer is formed between the ferromagnetic layer and the exchange energy control layer.

(Structure 6) In a magnetic disk for use in vertical magnetic recording, the magnetic disk comprises: a substrate; a ferromagnetic layer formed on the substrate and having a granular structure and containing an oxide, silicon (Si) or a silicon (Si) oxide; and an exchange energy control layer formed on the ferromagnetic layer. The exchange energy control layer includes a laminated layer composed of a first layer containing cobalt (Co) or a Co-alloy and a second layer containing palladium (Pd) or platinum (Pt), or the exchange energy control layer includes a single layer containing the Co-alloy. The exchange energy control layer contains a krypton (Kr) element.

As in the structure 1, in a method of manufacturing a vertical magnetic recording disk comprising at least a magnetic recording layer on a substrate and used for vertical magnetic recording, in a step of forming, on the substrate, the magnetic recording layer composed of a ferromagnetic layer having a granular structure and an exchange energy control layer formed on the ferromagnetic layer, at least the exchange energy control layer is formed through sputtering in an atmosphere of a rare gas having a greater mass than an argon gas.

According to the present invention, it is possible to suppose, as follows in accordance with considerations by the inventors, the reason why a deterioration in the interface state of the formed film can be suitably suppressed by using the rare gas having a greater mass than the conventional Ar gas. For example, the Kr gas is used for the sputtering film forming gas of the exchange energy control layer formed on the ferromagnetic layer having the granular structure constituting the magnetic recording layer.

When the Kr gas is used as the sputtering film forming gas of the exchange energy control layer, the energy of the gas atom colliding with the target, reflected from the target and reaching the substrate is smaller than that of the Ar gas.

Therefore, it is possible to relieve the effect of mixing atoms over the interface of the exchange energy control layer and to form a sharper interface (for example, the first layer containing the Co or Co-alloy and the second layer containing the Pd or Pt are observed with a clear separation through a TEM respectively).

As a result, a vertical magnetic anisotropy of the magnetic recording layer is increased so that a coercive force property can be enhanced.

Moreover, it is also possible to use a xenon (Xe) gas as the rare gas having a greater mass than the Ar gas.

In the case in which the xenon gas is used, magnetic property or recording and reproducing property (electromagnetic conversion characteristic) can be enhanced.

Examples of the magnetic material constituting the ferromagnetic layer includes a Co based magnetic material, and particularly, a CoPt based or CoPtCr based magnetic material is preferable.

The CoPt based or CoPtCr based magnetic material is suitable because a coercive force Hc can be high and a magnetization reversal generation magnetic field Hn can have a value which is smaller than zero, and therefore, a resistance to a thermal fluctuation can be enhanced and a high S/N ratio can be obtained.

Moreover, it is possible to segregate Si or an oxide into the grain boundary portion of the magnetic crystal grain by causing the CoPt based or CoPtCr based magnetic material to contain an element such as silicon (Si) or an oxide. Therefore, an exchange interaction between the magnetic crystal grains can be reduced to decrease medium noises and also the S/N ratio in a high recording density can be enhanced.

Si may be added as a single substance to the CoPt based or CoPtCr based magnetic material, and furthermore, may be added as an oxide or an Si oxide such as $SiO_2$. When the Si is added as the Si oxide such as $SiO_2$, the Si oxide is segregated into the grain boundary so that a magnetic interaction between the crystal grains of the magnetic recording layer can be reduced to decrease the medium noises, and furthermore, the S/N ratio in the high recording density can be enhanced.

When the Si or Si oxide is added to the CoPt based or CoPtCr based magnetic material, moreover, a crystal grain size can be reduced.

However, there is caused a problem in that the crystal grain size is excessively reduced and the thermal fluctuation is thus increased if an amount of addition of the Si or Si oxide is large. Therefore, the amount of addition of the Si oxide has been conventionally reduced to be 5 atomic % or less, for example.

For this reason, an increase in the recording density was naturally limited.

On the other hand, in the present invention, it is possible to prevent a deterioration in a thermal stability by providing the exchange energy control layer on the ferromagnetic layer containing the oxide, the silicon (Si) or the silicon (Si) oxide even if the amount of addition of the Si or Si oxide is increased. Therefore, it is possible to increase the recording density without deteriorating the thermal stability.

In the present invention, the ferromagnetic layer has a crystal grain containing Co as a main constituent and a grain boundary portion containing an oxide, silicon (Si) or an silicon (Si) oxide as a main constituent.

Consequently, it is possible to magnetically shield the crystal grains which are made fine.

A content of the silicon (Si) in the ferromagnetic layer is preferably equal to or higher than 6 atomic % and more preferably is in a range of 8 to 15 atomic %.

If the content of the silicon (Si) in the ferromagnetic layer is equal to or larger than 6 atomic %, the S/N ratio is rapidly enhanced. However, 8 to 15 atomic % is preferable for the following reasons.

When the content is smaller than 8 atomic %, the effect of reducing the medium noises is small and the S/N ratio in the high recording density cannot be enhanced sufficiently. When the content is larger than 15 atomic %, moreover, a vertical magnetic anisotropy is started to be deteriorated so that a deterioration in a thermal stability and an increase in a DC noise in the high recording density are caused.

For the same reasons, the content is particularly preferably in a range of 10 to 15 atomic % and is further preferably in a range of 12 to 15 atomic %.

In the present invention, the ferromagnetic layer has a granular structure containing Si or a Si oxide between the magnetic crystal grains containing Co.

Moreover, it is preferable that a film thickness of the ferromagnetic layer should be equal to or smaller than 20 nm. A range of 8 to 16 nm is desirable.

The exchange energy control layer has the function of carrying out magnetic coupling to the ferromagnetic layer adjacently to the ferromagnetic layer or through the spacer layer and the function of aligning easy directions of magnetization in mutual layers to be almost identical to each other.

The exchange energy control layer has crystal grains coupled magnetically therein.

It is advantageous that the exchange energy control layer should be specifically composed of a film formed by alternately laminating cobalt (Co) or a Co-alloy and palladium (Pd) or a film formed by alternately laminating the cobalt (Co) or the Co-alloy and platinum (Pt) for the ferromagnetic layer formed by the Co-based magnetic material. The alternate laminated film composed of the above materials has great magnetic Ku. Therefore, it is possible to reduce a width of a magnetic domain wall formed on the laminated film. It is preferable that a film thickness should be 1 to 8 nm.

It is desirable that the film thickness should be 2 to 5 nm. Even if a single layer film such as CoCrPt having a large Pt content, CoPt, CoPd, FePt, $CoPt_3$ or $CoPd_3$ is used in addition to the multilayer films for the material of the exchange energy control layer, the same advantage can be obtained.

In order to exhibit a suitable vertical magnetic recording property through a switched connection, moreover, it is necessary to increase the film thickness of the exchange energy control layer when the film thickness of the ferromagnetic layer is increased and to decrease the film thickness of the exchange energy control layer when the film thickness of the ferromagnetic layer is decreased, and to set both of the layers to have a suitable film thickness ratio.

In the case in which the film thickness of the ferromagnetic layer is represented by A and the film thickness of the exchange energy control layer is represented by B, it is preferable that A/B (A divided by B) should be 2 to 5. It is desirable that the A/B should be 3 to 4.

Moreover, it is suitable that a spacer layer should be provided between the ferromagnetic layer and the exchange energy control layer.

By providing the spacer layer, it is possible to suitably control the switched connection between the ferromagnetic layer and the exchange energy control layer. As the spacer layer, for example, a Pd layer or a Pt layer is suitably used corresponding to a material of the exchange energy control layer.

In the case in which the Pd layer is used for the exchange energy control layer, the Pd layer is also used for the spacer layer. This is because the use of the same composition is economically preferable in respect of a restriction of a manufacturing apparatus.

A film thickness of the spacer layer is preferably equal to or smaller than 2 nm and desirably ranges from 0.1 to 1.5 nm.

While the ferromagnetic layer and the exchange energy control layer are provided adjacently to each other or through the spacer layer, it is preferable that the exchange energy control layer should be disposed on the ferromagnetic layer as viewed from the substrate in respect of an Head Disk Interface (HDI).

Moreover, the ferromagnetic layer is not restricted to a single layer but may be constituted by a plurality of layers. In this case, Co based magnetic layers containing the Si or Si oxide may be combined with each other or the Co based magnetic layer containing the Si or Si oxide and a Co based magnetic layer containing neither the Si nor the Si oxide may be combined with each other.

It is preferable that the Co based magnetic layer containing the Si or Si oxide should be disposed on an adjacent side to the exchange energy control layer.

As a method of forming the vertical magnetic recording layer according to the present invention, it is preferable that the film should be formed by a sputtering method.

When the film is formed by a DC magnetron sputtering method, particularly, the film can be uniformly formed, which is preferable.

In the present invention, when the vertical magnetic recording layer composed of the ferromagnetic layer and the exchange energy control layer is to be formed on the substrate, the ferromagnetic layer is formed on the substrate through sputtering in an argon gas atmosphere and the exchange energy control layer is then formed through the sputtering in an atmosphere of a rare gas having a greater mass than an argon gas, for example, a krypton (Kr) gas atmosphere.

A film forming gas to be used for forming the exchange energy control layer is not restricted to the krypton (Kr) gas if a rare gas having a greater mass than the argon gas is used, but the krypton gas can easily be handled and is therefore preferable.

Moreover, it is preferable that a gas pressure should be low in the film formation of the exchange energy control layer. As a reason, if the ferromagnetic layer is not provided adjacently, it is necessary to cause the exchange energy control layer to be magnetically uniform in order to fix a magnetic domain wall (a magnetization transition point) by a pinning force generated from a magnetic particle of the ferromagnetic layer everywhere in such a manner that the magnetic domain wall can be moved freely. For this purpose, it is suitable that the film should be formed at a low gas pressure.

In this case, for example, the film is formed through the sputtering at the gas pressure in a range of 1 to 10 mTorr, preferably, in a range of 3 to 4 mTorr.

Although the temperature of the substrate in forming the exchange energy control layer is not particularly restricted, moreover, it is preferable that the temperature should range from a room temperature to 150° C. in respect of suppression of diffusion over a lamination interface, for example.

In present the invention, the exchange energy control layer is formed by the sputtering in the krypton gas atmosphere, for example. Consequently, a krypton (Kr) element is contained in the formed exchange energy control layer.

On the other hand, it is preferable that the ferromagnetic layer should be formed at a high gas pressure.

This is because a magnetic grain size in the ferromagnetic layer can be reduced and the Si or Si oxide can be subjected to a grain boundary segregation in a uniform thickness between the magnetic crystal grains containing Co in order to decrease the medium noises.

It is preferable that the ferromagnetic layer should be formed by the sputtering at a gas pressure of 15 to 30 mTorr, for example.

In the present invention, while the krypton gas is used as the film forming gas of the exchange energy control layer, for example, it is also possible to use the krypton gas in place of the argon gas for the film forming gas of the ferromagnetic layer.

While the vertical magnetic recording disk according to the present invention comprises at least the vertical magnetic recording layer on the substrate, it is preferable that various other functional layers should be provided.

For example, it is also possible to provide, on the substrate, a soft magnetic layer for suitably regulating a magnetic circuit of the vertical magnetic recording layer.

In the present invention, if the soft magnetic layer is formed by a magnetic body having a soft magnetic property, there is not particular restriction. However, a magnetic property preferably has a coercive force (Hc) of 0.01 to 80 oersteds and more preferably 0.01 to 50 oersteds.

Moreover, it is preferable that the magnetic property should have a saturation magnetic flux density (Bs) of 500 emu/cc to 1920 emu/cc.

Examples of a material of the soft magnetic layer include an Fe based material and a Co based material.

For example, it is possible to use an Fe based soft magnetic material such as an FeTaC based alloy, an FeTaN based alloy, an FeNi based alloy, an FeCoB based alloy or an FeCo based alloy, a Co based soft magnetic material such as a CotaZr based alloy or a CoNbZr based alloy, or an FeCo based alloy soft magnetic material.

In addition to a single layer structure of the alloy materials, it is also possible to employ a lamination structure in which an Ru layer is interposed between a plurality of layers formed by the alloy materials, for example.

In the present invention, the thickness of the soft magnetic layer is preferably 30 nm to 1000 nm, and is desirably 50 nm to 200 nm.

In some cases in which the film thickness is smaller than 30 nm, it is hard to form a suitable magnetic circuit among the magnetic head, the vertical magnetic recording layer and the soft magnetic layer. In some cases in which the film thickness is greater than 1000 nm, a surface roughness is increased.

In some cases in which the film thickness is greater than 1000 nm, moreover, it is hard to carry out the sputtering film formation.

In the present invention, it is preferable to provide, on the substrate, a non-magnetic ground layer for setting a crystal orientation of the vertical magnetic recording layer in a perpendicular direction to a substrate surface.

As a material of the non-magnetic ground layer, Ru, Pd, Pt and Ta based alloys and a Ti based alloy are preferable. Examples of the non-magnetic ground layer formed by the Ta based alloy include a CoCrTa based alloy and an NiTa based alloy in addition to a Ta single substance.

Examples of the non-magnetic ground layer formed by the Ti based alloy include a TiCr based alloy and a TiCo based alloy in addition to a Ti single substance.

It is suitable that a film thickness of the non-magnetic ground layer should be 2 nm to 30 nm. The function of controlling a crystal axis of the vertical magnetic recording layer is insufficient when the film thickness of the ground layer is smaller than 2 nm. The size of the magnetic crystal grain constituting the vertical magnetic recording layer is increased and thus the noise is increased when the film thickness exceeds 30 nm, which is not preferable.

In the present invention, it is preferable that the substrate should be a glass if annealing in a magnetic field is required to control a magnetic domain of the soft magnetic layer.

Since the glass substrate is excellent in a heat resistance, it is possible to increase a heating temperature of the substrate.

Examples of the glass for the substrate include an aluminosilicate glass, an aluminoborosilicate glass and a soda thyme glass. Above all, the aluminosilicate glass is suitable. Moreover, it is possible to use an amorphous glass and a crystallized glass.

In the case in which the soft magnetic layer is amorphous, it is preferable that the substrate should be an amorphous glass. The use of a chemical strengthened glass is preferable because of a high rigidity.

In the present invention, it is preferable that a surface roughness of a main surface of the substrate should have Rmax of 6 nm or less and Ra of 0.6 nm or less.

By forming a smooth surface, it is possible to set a gap between the vertical magnetic recording layer and the soft magnetic layer to be constant. Therefore, it is possible to form a suitable magnetic circuit among the magnetic head, the vertical magnetic recording layer and the soft magnetic layer.

In the present invention, it is also preferable to form a bonding layer between the substrate and the soft magnetic layer.

By forming the bonding layer, it is possible to enhance a bonding property between the substrate and the soft magnetic layer. Therefore, it is possible to prevent the soft magnetic layer from being peeled.

As a material of the bonding layer, it is possible to use a Ti containing material, for example.

From a practical viewpoint, it is preferable that a film thickness of the bonding layer should be set to be 1 nm to 50 nm.

In the vertical magnetic recording disk according to the present invention, it is suitable that a protecting layer should be provided on the vertical magnetic recording layer.

By providing the protecting layer, it is possible to protect the surface of the magnetic disk from the magnetic recording head floating and flying over the magnetic disk.

As a material of the protecting layer, for example, a carbon based protecting layer is suitable. Moreover, it is suitable that a film thickness of the protecting layer should be approximately 1.5 nm to 7 nm.

Moreover, it is preferable that a lubricating layer should be further provided on the protecting layer.

By providing the lubricating layer, it is possible to suppress an abrasion between the magnetic head and the magnetic disk, thereby enhancing durability of the magnetic disk. As a material of the lubricating layer, PFPE (perfluoropolyether) is preferable, for example.

Furthermore, it is suitable that a film thickness of the lubricating layer should be approximately 0.5 nm to 1.5 nm.

It is preferable that the soft magnetic layer, the ground layer, the bonding layer and the protecting layer should also be formed by the sputtering method.

In particular, a film can be uniformly formed by a DC magnetron sputtering method, which is preferable.

It is also preferable to use an inline type film forming method.

It is also preferable that the protecting layer should be formed by a plasma CVD method. Moreover, it is preferable that the lubricating layer should be formed by a dip coating method, for example.

Advantage of the Invention

According to the present invention, it is possible to provide a method of manufacturing a vertical magnetic recording disk and the vertical magnetic recording disk which can enhance a magnetic property still more, thereby increasing an information recording density.

BRIEF DESCRIPTION OF THE DRAWINGS

FIG. 1 is a schematic sectional view showing a vertical magnetic recording disk according to an embodiment of the present invention.

DESCRIPTION OF THE DESIGNATIONS 1 glass substrate
2 bonding layer
3 soft magnetic layer
4a first ground layer
4b second ground layer
5 ferromagnetic layer
6 spacer layer
7 exchange energy control layer (laminated layer)
8 carbon based protecting layer
9 lubricating layer
10 vertical magnetic recording disk

BEST MODE FOR CARRYING OUT THE INVENTION

A vertical magnetic recording disk according to an embodiment of the present invention is shown in FIG. 1.

Referring to FIG. 1, a vertical magnetic recording disk 10 according to the embodiment of the present invention has a structure in which a bonding layer 2, a soft magnetic layer 3, a first ground layer 4a, a second ground layer 4b, a ferromagnetic layer 5, a spacer layer 6 and an exchange energy control layer 7 formed by a lamination, a carbon based protecting layer 8 and a lubricating layer 9 are provided on a glass substrate 1 in order.

The present invention will be further specifically described below with reference to examples and comparative examples.

Example 1

An amorphous aluminosilicate glass was molded in a disk-shape by a direct press and a glass disk was thus fabricated.

The glass disk was sequentially subjected to grinding, polishing and chemical strengthening so that a smooth non-magnetic glass substrate 1 formed by a chemical strengthened glass disk was obtained. A disk diameter is 65 mm.

A surface roughness of a main surface of the glass substrate 1 was measured by an atomic force microscope (AFM) so that a smooth surface shape having Rmax of 4.8 nm and Ra of 0.42 nm was observed. The Rmax and Ra conform to the Japanese Industrial Standard (JIS).

Next, the bonding layer 2 and the soft magnetic layer 3 were sequentially formed on the obtained glass substrate 1 in an Ar gas atmosphere through a DC magnetron sputtering method by using a film forming apparatus carrying out vacuuming.

At this time, the bonding layer 2 was formed using a CrTi target to obtain a CrTi (Cr: 55 at %, Ti: 45 at %) having a film thickness of 10 nm.

Moreover, the soft magnetic layer 3 was formed using a CoTaZr target to have an amorphous CoTaZr (Co: 88 at %, Ta: 7 at %, Zr: 5 at %) layer having a film thickness of 20 nm, and an Ru layer having a film thickness of 0.7 nm was formed thereon, and furthermore, the same CoTaZr layer having the film thickness of 20 nm as described above was formed thereon.

A substrate for vertical magnetic recording disk in which the soft magnetic layer 3 had completely been formed was taken out of the film forming apparatus.

A surface roughness of the obtained substrate for vertical magnetic recording disk in which the film formation had been completed up to the soft magnetic layer 3 was measured by the AFM in the same manner. As a result, a smooth surface shape having Rmax of 5.1 nm and Ra of 0.48 nm was observed.

Furthermore, magnetic property of the substrate was measured by a Vibrating Sample Magnetometer (VSM). As a result, a coercive force (Hc) was 2 oersteds and a saturation magnetic flux density was 950 emu/cc, and a suitable soft magnetic property was exhibited. By forming a ground layer and a vertical magnetic recording layer on the soft magnetic layer 3 including the smooth surface shape having Rmax of 5.5 nm or less and Ra of 0.5 nm or less, it is possible to suitably reduce a noise.

Next, the first ground layer 4a, the second ground layer 4b, the ferromagnetic layer 5 and the spacer layer 6 were sequentially formed on the obtained substrate in an Ar gas atmosphere through the DC magnetron sputtering method by using a branch/stationary opposed type film forming apparatus carrying out vacuuming.

First of all, the first ground layer 4a formed of Ta and having a thickness of 3 nm and the second ground layer 4b formed of Ru and having a thickness of 20 nm were provided on the substrate on which the soft magnetic layer 3 had completely been formed.

Two layers may be formed of Ru. More specifically, it is possible to improve a crystal orientation by forming the upper layer side Ru at a higher gas pressure than a gas pressure of an Ar gas used when forming the lower layer side Ru.

Next, the ferromagnetic layer 5 having an hcp crystal structure in a thickness of 13 nm was formed using a target to be a hard magnetic substance formed of CoCrPt containing $SiO_2$. A composition of the target for forming the ferromagnetic layer 5 is Co: 66.6 at %, Cr: 9 at %, Pt: 14.4 at % and $SiO_2$: 10 mol %. The ferromagnetic layer 5 was formed at a gas pressure of 30 mTorr.

Subsequently, the spacer layer 6 formed of Pd and having a thickness of 0.2 nm was provided.

Then, a film forming gas was changed into a Kr gas and the exchange energy control layer 7 formed by an alternate laminated film of CoPt and Pd was formed in a Kr gas atmosphere. First of all, CoPt (Co: 75 at %, Pt: 25 at %) was formed as a film in a thickness of 0.4 nm, and then Pd was formed thereon as a film in a thickness of 0.4 nm. This forming process is one cycle. This forming process was repeatedly performed in three cycles to form the film.

Accordingly, a total thickness of the laminated film is 2.4 nm. The exchange energy control layer 7 was formed at a gas pressure of 10 mTorr.

The exchange energy control layer 7 formed as described above contains Kr.

Description will be given to a measurement of the krypton in the exchange energy control layer.

The surface of the magnetic disk having the protecting layer formed thereon was measured through a time of flight-secondary ion mass spectrometer method.

The time of flight-secondary ion mass spectrometer (hereinafter referred to as TOF-SIMS) indicates a secondary ion mass spectrometric method using a time of flight mass spectrometer for a detecting system.

In the measurement, TRIFT II to be TOF-SIMS manufactured by PHI Co., Ltd. was utilized. In the TOF-SIMS analysis in the measurement, a gallium ion (Ga+) was used as a primary ion.

In the measurement, a beam energy was set to be 15 KeV.

An irradiating surface (sputtering size) of the primary ion is a square region having a length of 200 μm and a width of 200 μm over the surface of the magnetic disk and has an area of 40000 $μm^2$, and an analyzed region is a square region having a length of 50 μm and a width of 50 μm and has an area of 2500 $μm^2$.

An analyzing time in each depth is one minute. A detected mass range of the secondary ion was set to be a mass number of 1 to 1000.

In accordance with the above conditions, amounts of carbon, krypton and cobalt were measured while digging the surface of the magnetic disk.

In an initial stage of the measurement, the cobalt and the carbon were detected. In reaching such a depth that the exchange energy control layer is present, the krypton was detected in a large amount.

At this time, the amount of the krypton was 35 ion counts.

Then, when observation was carried out while further digging the surface of the magnetic disk, it was found that the amount of the krypton is decreased.

Consequently, it could be confirmed that the krypton is present in the exchange energy control layer.

Next, the carbon based protecting layer 8 formed of hydrogenated carbon was formed by a plasma CVD method. A film thickness of the carbon based protecting layer 8 is 3.5 nm.

By using the hydrogenated carbon, film hardness can be enhanced. Therefore, it is possible to protect the vertical magnetic recording layer from a shock applied from the magnetic head.

Thereafter, the lubricating layer 9 formed of perfluoropolyether (PFPE) was formed by a dip coating method.

The lubricating layer 9 has a film thickness of 1 nm.

Through the above manufacturing steps, the vertical magnetic recording disk according to the example was obtained. A surface roughness of the vertical magnetic recording disk thus obtained was measured through the AFM in the same manner. As a result, a smooth surface shape having Rmax of 4.53 nm and Ra of 0.40 nm was observed.

The formation of the spacer layer 6 and the exchange energy control layer 7 improved the surface roughnesses Rmax and Ra.

It can be supposed that the improvement in the roughness is mainly caused by a reduction in the surface roughness of the exchange energy control layer 7 formed in the Kr gas atmosphere. Consequently, it is also possible to produce such a new advantage that glide property and floating property can be improved and the thickness of the protecting film can be reduced.

An orientation of the vertical magnetic recording layer in the obtained vertical magnetic recording disk according to the example (the ferromagnetic layer 5, the spacer layer 6 and the exchange energy control layer 7 are referred to as the vertical magnetic recording layer as a whole) was analyzed by an X-ray diffraction method. Consequently, a c-axis of an hcp (hexagonal close-packed) crystal structure was oriented in a perpendicular direction to a disk surface.

Moreover, the ferromagnetic layer 5 in the obtained vertical magnetic recording disk was analyzed in detail by utilizing a transmission electron microscope (TEM), so that the ferromagnetic layer 5 was found to have a granular structure.

More specifically, it was confirmed that a grain boundary portion formed of Si oxide is formed between crystal grains of the hcp crystal structure containing Co.

From the analysis, it was found that a boundary region formed by a magnetic grain having a size of approximately 6 nm and a non-magnetic substance having a size of approximately 2 nm is formed. On the other hand, the exchange energy control layer 7 provided on the ferromagnetic layer 5 having the granular structure was analyzed in detail through the TEM. As a result, the granular structure was not observed.

This indicates that the exchange energy control layer 7 has a structure which is almost magnetically continuous.

In other words, it is indicated that the magnetic grains of the ferromagnetic layer 5 having the granular structure are magnetically coupled through the exchange energy control layer 7.

Consequently, it can be supposed that a thermal stability is enhanced.

Example 2

A vertical magnetic recording disk was obtained in the same manner as in the example 1 except that the film thickness of the ferromagnetic layer 5 was set to be 13.5 nm, the film thickness of the spacer layer 6 was set to be 0.3 nm and the exchange energy control layer 7 was set to a film laminated in a cycle of CoPt having a thickness of 2.2 nm and Pd having a thickness of 0.4 nm (Example 2).

An orientation of a vertical magnetic recording layer in the obtained vertical magnetic recording disk was analyzed through an X-ray diffraction method. As a result, a c-axis of an hcp (hexagonal close-packed) crystal structure was oriented in a perpendicular direction to a disk surface in the same manner as in the example 1.

Moreover, the ferromagnetic layer 5 in the obtained vertical magnetic recording disk was analyzed in detail by utilizing a transmission electron microscope (TEM). As a result, a granular structure was observed in the same manner as in the example 1.

Example 3

A vertical magnetic recording disk was obtained in the same manner as in the example 1 except that the first ground layer 4a was set to CoCrTa (Co: 55 at %, Cr: 35 at %, Ta: 10 at %) having a film thickness of 3 nm, the film thickness of the ferromagnetic layer 5 was set to 12 nm, the film thickness of the spacer layer 6 was set to 0.8 nm and the exchange energy control layer 7 was set to a film alternately laminated in three cycles of CoB (Co: 95 at %, B: 5 at %) having a thickness of 0.35 nm and Pd having a thickness of 0.8 nm (Example 3).

An orientation of a vertical magnetic recording layer in the obtained vertical magnetic recording disk was analyzed through an X-ray diffraction method. As a result, a c-axis of an hcp (hexagonal close-packed) crystal structure was oriented in a perpendicular direction to a disk surface in the same manner as in the example 1.

Moreover, the ferromagnetic layer 5 in the obtained vertical magnetic recording disk was analyzed in detail by utilizing a transmission electron microscope (TEM). As a result, a granular structure was observed in the same manner as in the example 1.

Example 4

A vertical magnetic recording disk was obtained in the same manner as in the example 1 except that the first ground layer 4a was set to Ta (a total film thickness of 3 nm) having a double structure in which a gas pressure upon forming the first ground layer 4a in Example 1 is changed, the film thickness of the ferromagnetic layer 5 was set to 10.5 nm, the film thickness of the spacer layer 6 was set to Pt having a film thickness of 0.8 nm and the exchange energy control layer 7 was set to a film alternately laminated in three cycles of CoB (Co: 95 at %, B: 5 at %) having a thickness of 0.35 nm and Pt having a thickness of 0.8 nm (Example 4).

An orientation of a vertical magnetic recording layer in the obtained vertical magnetic recording disk was analyzed through an X-ray diffraction method. As a result, it was found that a c-axis of an hcp (hexagonal close-packed) crystal structure is oriented in a perpendicular direction to a disk surface in the same manner as in the example 1.

Moreover, the ferromagnetic layer 5 in the obtained vertical magnetic recording disk was analyzed in detail by utilizing a transmission electron microscope (TEM). As a result, a granular structure was observed in the same manner as in the example 1.

Comparative Example

A vertical magnetic recording disk was obtained in the same manner as in the example 1 except that the exchange energy control layer 7 was formed through the sputtering in an Ar gas atmosphere (a gas pressure was equal to that in the example 1) in the example 1.

A surface roughness of the obtained vertical magnetic recording disk was measured through an AFM. As a result, a surface shape having Rmax of 6.26 nm and Ra of 0.48 nm was obtained. The surface is rougher than that in the vertical magnetic recording disk according to the example 1.

Furthermore, an orientation of the ferromagnetic layer 5 in the obtained vertical magnetic recording disk was analyzed through an X-ray diffraction method. As a result, it was found that a c-axis of an hcp (hexagonal close-packed) crystal structure is oriented in a perpendicular direction to a disk surface.

Moreover, the ferromagnetic layer 5 in the obtained vertical magnetic recording disk was analyzed in detail by utilizing a transmission electron microscope (TEM). As a result, a granular structure was observed.

Magnetostatic properties of the obtained vertical magnetic recording disks according to the examples and the comparative example were evaluated through a VSM and a polar kerr loop tracer, and results of measurement of a coercive force (Hc) and a magnetization reversal nucleation field (Hn) are collectively shown in the following Table 1.

Moreover, electromagnetic conversion characteristics of the vertical magnetic recording disks according to the examples and the comparative example were measured in the following manner and the results are collectively shown in the following Table 1.

An R/W analyzer (DECO) and a magnetic head for vertical magnetic recording system having a recording side provided with an SPT unit and a reproducing side provided with a GMR unit were used to carry out a measurement.

At this time, a floating amount of the magnetic head was 10 nm.

A method of measuring S/N (DC), S/N (MF) and overwrite property (O/W) is as follows.

The highest recording density (1 F) was set to 960 kfci to measure S/N (DC) and S/N (MF) for the S/N ratio.

The S/N (DC) was calculated by recording a carrier signal on a vertical magnetic recording medium at a recording density of 24 F (40 kfci) and then observing a medium noise from a DC frequency region to a frequency region which is 1.2 times as high as 1 F by using a spectroanalyzer.

Moreover, the S/N (MF) was calculated by recording the carrier signal on the vertical magnetic recording medium at a recording density of 2 F (480 kfci) and then observing a medium noise from the DC frequency region to the frequency region which is 1.2 times as high as 1 F by using the spectroanalyzer.

Furthermore, the overwrite property was obtained by recording the carrier signal on the vertical magnetic recording medium at the recording density of 24 F (480 kfci), then overwriting a carrier at a recording density of 1 F (960 kfci), and then measuring an original carrier reproducing output at the recording density of 24 F (40 kfci) and a residual reproducing output of a 12 F carrier after the 1 F overwriting.

In addition, a Magnetic Write Width (referred to as MWW) was measured in the following manner and the result is collectively shown in the following Table 1.

More specifically, the MWW was obtained by recording a signal of 6 F after an AC demagnetization and measuring a half-value width of one track profile (maximum (max.) TAA (Track Average Amplitude)). A final value (a value in the Table 1) was set to a mean value of five measurements.

TABLE 1

| Table 1 | Hc (Oe) | Hn (Oe) | O/W (dB) | S/N (DC) (dB) | S/N (MF) (dB) | MWW (µm) |
|---|---|---|---|---|---|---|
| Example 1 | 4500 | −1300 | 48 | 22 | 13.5 | 0.147 |
| Example 2 | 4300 | −1500 | 45 | 23 | 13.5 | 0.153 |
| Example 3 | 5000 | −2000 | 40 | 25 | 14.5 | 0.140 |
| Example 4 | 4300 | −1700 | 45 | 24 | 12.0 | 0.153 |
| Comparative example | 4000 | −200 | 50 | 20 | 12.5 | 0.160 |

From the result of the Table 1, it is possible to enhance the magnetic property of the medium still more as compared with the case in which a conventional argon gas is used by utilizing a krypton gas having a greater mass than argon as a sputtering gas in the sputtering film formation of the exchange energy control layer constituting the vertical magnetic recording layer, for example. According to the present invention, therefore, it is apparent that a recording density can be increased still more.

INDUSTRIAL APPLICABILITY

According to the present invention, it is possible to provide a method of manufacturing a vertical magnetic recording disk and the vertical magnetic recording disk which can increase an information recording density by enhancing a magnetic property still more. Therefore, an industrial applicability is very great.

ENGLISH TRANSLATION OF LEDEND OF THE DRAWINGS

FIG. 1
10 vertical magnetic recording disk
9 lubricating layer
8 carbon based protecting layer
7 laminated layer
6 spacer layer
5 ferromagnetic layer
4b second ground layer
4a first ground layer
3 soft magnetic layer
2 bonding layer
1 glass substrate

The invention claimed is:

1. A method of manufacturing a vertical magnetic recording disk comprising at least a magnetic recording layer on a substrate and used for vertical magnetic recording at a density greater than 100 Gb/in$^2$, said method comprising:
   providing the substrate; and
   forming, on the substrate, the magnetic recording layer, said forming step further comprising (a) forming a ferromagnetic layer having a granular structure and (b) forming an exchange energy control layer on the ferromagnetic layer,
   wherein at least the exchange energy control layer is formed through sputtering in an atmosphere of a rare gas having a greater mass than an argon gas, said sputtering being conducted at a gas pressure in a range of 1-10 m Torr and producing said energy control layer having a thickness of 2-5 nm,
   wherein the exchange energy control layer is a laminated layer consisting of a plurality of first layers consisting of Co or a Co-alloy and a plurality of second layers consisting of palladium (Pd) with said rare gas embedded therein,
   whereby the surface roughness of the disk having an exchange energy control layer that is formed through sputtering in an atmosphere of a rare gas having a greater mass than an argon gas, as determined by Ra and Rmax as measured by AFM, is less than that where an exchange energy control layer is formed through sputtering in an atmosphere of argon,
   whereby the coercive force (Hc) of the resulting structure is equal to or greater than 4300 Oe,
   wherein the magnetization reversal nucleation field (Hn) of the disk is −1300 Oe or smaller,
   wherein the ferromagnetic layer has a crystal grain containing cobalt (Co) as a main constituent and a grain boundary portion containing a silicon (Si) or a silicon (Si) oxide as a main constituent, and
   wherein a content of the silicon in the ferromagnetic layer is in a range of 8 to 15 atomic %,
   wherein a thickness of the ferromagnetic layer is 8-16 nm,
   wherein a ratio of the thickness of the ferromagnetic layer to the thickness of the exchange energy control layer is 3 to 4.

2. The method according to claim 1, wherein the rare gas having a greater mass than the argon gas is a krypton (Kr) gas.

3. The method according to claim 1, wherein a spacer layer is formed between the ferromagnetic layer and the exchange energy control layer.

4. The method according to claim 3, wherein the spacer layer is formed in said atmosphere of a rare gas having a greater mass than an argon gas at a thickness of the spacer layer within a range of 0.1 nm to 2.0 nm.

5. The method according to claim 1, wherein Rmax is 6 nm or less and Ra is 0.6 nm or less.

6. The method according to claim 1, wherein the ferromagnetic layer also is produced in said atmosphere of a rare gas having a greater mass than argon gas.

7. The method according to claim 1, wherein the sputtering is conducted at a gas pressure in a range of 3-4 m Torr.

8. The method according to claim 1, wherein the ferromagnetic layer is formed through sputtering in a gas pressure of 15 to 30 mTorr.

9. The method according to claim 1, further comprising forming, between the substrate and the magnetic recording layer, a soft magnetic layer having a coercive force (Hc) of 0.01 to 50 Oe.

10. The method according to claim 9, wherein the soft magnetic layer has a saturation magnetic flux density (Bs) of 500-1920 emu/cc.

11. The method according to claim 9, wherein a thickness of the soft magnetic layer is 30-1000 nm.

12. The method according to claim 9, wherein a thickness of the soft magnetic layer is 50-200 nm.

* * * * *